United States Patent
Sawano

(10) Patent No.: US 6,281,985 B1
(45) Date of Patent: *Aug. 28, 2001

(54) PRINT CONTROL APPARATUS, PRINT CONTROL METHOD, AND MEMORY MEDIUM

(75) Inventor: Yasuaki Sawano, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,137

(22) Filed: Apr. 15, 1998

(30) Foreign Application Priority Data

Apr. 17, 1997 (JP) .................................................... 9-100420
Mar. 27, 1998 (JP) .................................................. 10-081380

(51) Int. Cl.[7] ...................................................... G06F 15/00
(52) U.S. Cl. ............................................. 358/1.9; 358/524
(58) Field of Search ...................................... 395/114, 109, 395/117, 115; 358/1.15, 1.9, 1.11, 1.13, 1.16, 1.17, 1.18, 524; 382/166, 233, 306, 114

(56) References Cited

U.S. PATENT DOCUMENTS

| | | | | |
|---|---|---|---|---|
| 4,235,167 | * | 11/1980 | Staugaard | 101/93.09 |
| 5,483,622 | * | 1/1996 | Zimmerman et al. | 395/114 |
| 5,732,202 | * | 3/1998 | Okamoto | 395/117 |
| 5,768,486 | * | 6/1998 | Sugaya | 395/116 |

* cited by examiner

Primary Examiner—Joseph Mancuso
Assistant Examiner—Douglas Tran
(74) Attorney, Agent, or Firm—Fitzpatrick, Cella, Harper & Scinto

(57) ABSTRACT

A print controller includes a band memory which stores data to be output on a predetermined basis from a printer engine, and a decompressor which decompresses compressed font data to bit map font data. Also included is a discrimination which discriminates whether or not the decompressed bit map font data is developed across a plurality of bands which are set in the band memory. Lastly included is a cache memory which caches the decompressed bit map font data in the case where the discrimination discriminates that the decompressed bit map font data is developed across the plurality of bands.

16 Claims, 8 Drawing Sheets

FIG. 7

MEM MEDIUM ROM (ROM 1-2)

| DIRECTORY |
|---|
| FIRST DATA PROCESSING PROGRAM PROGRAM CODE GROUP FOR STEPS OF THE FLOWCHART SHOWN IN FIGS. 2 AND 3 |
| |

PRINT CONTROL APPARATUS, PRINT CONTROL METHOD, AND MEMORY MEDIUM

BACKGROUND OF THE INVENTION

1. Field of the Invention

The invention relates to a print control apparatus, print control method, and memory medium for performing a band process.

2. Related Background Art

The processing operation of a conventional printing apparatus will now be described with reference to the a flowchart shown in FIG. 8.

FIG. 8 is a flowchart showing an example of a data processing procedure of a conventional printing apparatus. Reference numerals (1) to (9) denote processing steps.

First, in step (1), a check is made to see if a bit map developing process of one band is finished. If YES, the processing routine is finished. If NO, a CPU analyzes character code data for every character (2) and first discriminates whether a font of the relevant character has been registered in a compressed font cache memory (3). If it is decided that the font has been registered, its compressed font is decompressed by a decompressor (8) and developed into a band memory (9).

If it is decided in step (3) that the font is not registered, a check is made to see if it has been registered in the compressed font in the font ROM (4). If YES, the compressed font is decompressed by a decompressor (8) and is developed in the band memory (9).

If it is determined in step (4) that the font is not registered, a scalable font corresponding to the character is read out from a scalable font in the font ROM and is scaled by the CPU (5). The scaled font is developed into the band memory (5-1). A bit map font of the character is compressed by a compressor (6) and is registered into a compressed font cache memory (7). The processing routine is then returned to step (1).

As mentioned above, in the foregoing conventional printing apparatus, even in a case where a certain character lies across a plurality of bands, the same character font is decompressed every band by the decompressor and the corresponding portion is read out and developed into the band memory. There is consequently a problem that band processing efficiency deteriorates.

SUMMARY OF THE INVENTION

The invention is made to solve the above problem and it is an object of the invention to provide a print control apparatus and a print control method, in which when printable bit map font data is decompressed from a compressed font, with respect to a character which lies across a plurality of bands, by caching the character in a state of a bit map font, it is directly developed into a band memory from a bit map font cache memory at the time of a developing process of the band, a processing burden upon band development is reduced, and a development processing time is reduced, and also to provide a computer-readable memory medium encoded with a program.

According to the invention, there is provided a print control apparatus comprising: a band memory for storing data to be outputted from a printer engine on a predetermined band unit basis; decompressing means for decompressing compressed font data into bit map font data; discriminating means for discriminating whether or not the bit map font data decompressed by the decompressing means is developed across a plurality of bands which are set in the band memory and a cache memory for caching the bit map font data decompressed by the decompressing means in the case where the discriminating means determines that the decompressed bit map font data is developed across a plurality of bands.

According to the invention, there is provided a print control method of developing data to be outputted from a printer engine into a band memory on a predetermined band unit basis, comprising: a decompressing step of decompressing compressed font data to bit map font data; a discriminating step of discriminating whether or not the decompressed bit map font data is developed across a plurality of bands which are set in the band memory and a caching step of caching the decompressed bit map font data into a cache memory in the case where it is determined by the discriminating step that the decompressed bit map font data is developed across a plurality of bands.

According to the invention, there is also provided a computer-readable memory medium encoded with a program for controlling development of data to be outputted from a printer engine into a band memory on a predetermined band unit basis, wherein the memory medium stores a program comprising: a decompressing step of decompressing compressed font data to bit map font data; a discriminating step of discriminating whether or not the decompressed bit map font data is developed across a plurality of bands which are set in the band memory; and a caching step of caching the decompressed bit map font data into a cache memory when it is determined by the discriminating step that the decompressed bit map font data is developed across a plurality of bands.

According to the invention, there is provided a print control apparatus comprising: discriminating means for discriminating whether a character lies across bands or not; and generating means for generating data so that it can be read out and developed in a non-compressed state when it is developed in a band memory in the case where it is determined by the discriminating means that the character lies across the bands.

According to the invention, there is provided a print control method comprising: a discriminating step of discriminating whether a character lies across bands; and a generating step of generating data so that it can be read out and developed in a non-compressed state when it is developed in a band memory in the case where it is determined by the discriminating step that the character lies across the bands.

According to the invention, there is provided a memory medium for storing a program comprising: a discriminating step of discriminating whether or not a character lies across bands and a generating step of generating data so that it can be read out and developed in a non-compressed state when it is developed in a band memory in the case where it is determined by the discriminating step that the character lies across the bands.

BRIEF DESCRIPTION OF THE DRAWINGS

FIG. 7 is a diagram showing a memory map of a memory medium to store a program according to the flowcharts.

DETAILED DESCRIPTION OF THE PREFERRED EMBODIMENTS

Figure 1:
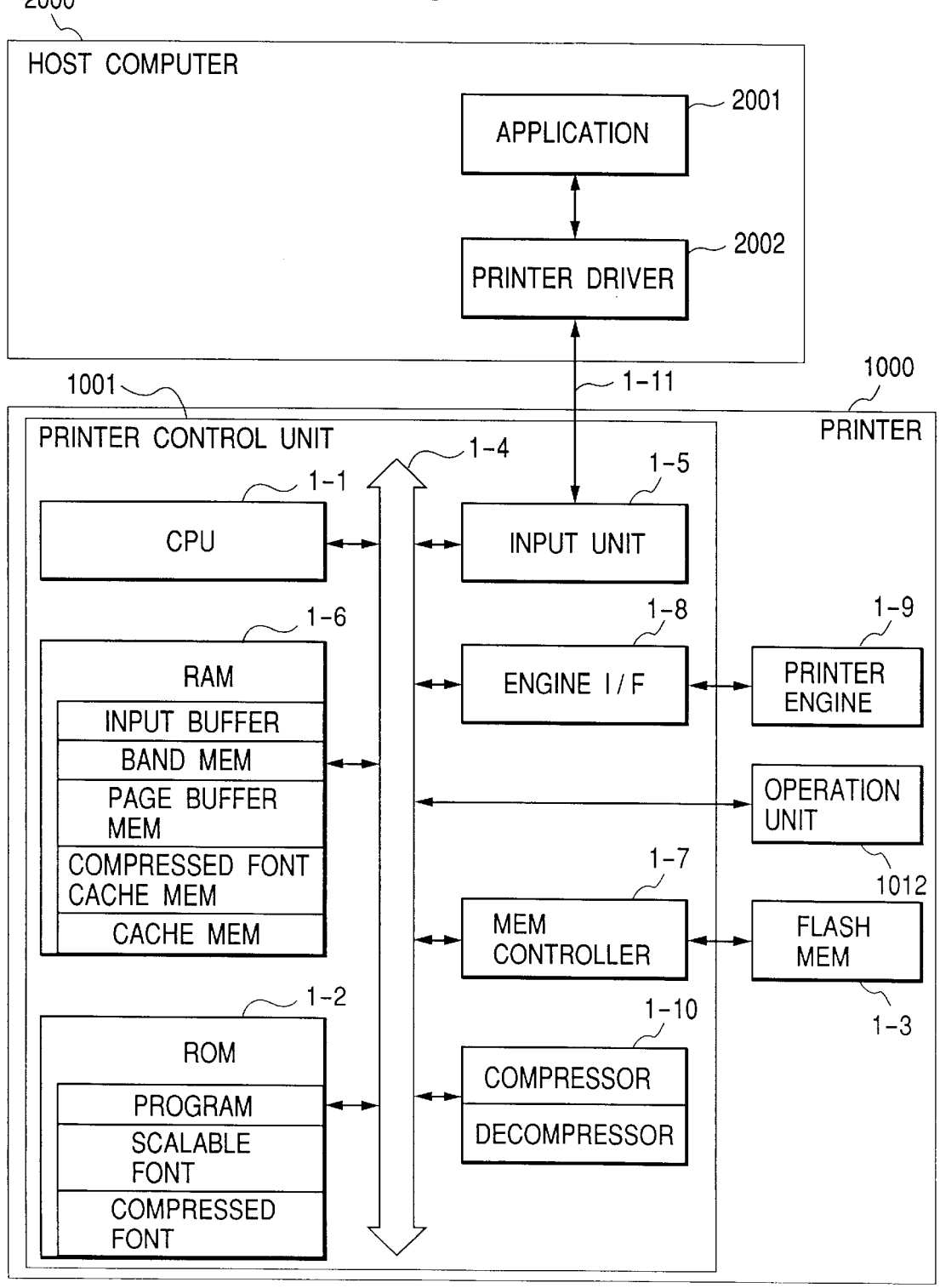
FIG. 1 is a block diagram for explaining a construction of a print control apparatus showing an embodiment of the invention.

FIG. 1 is a block diagram of mainly a printer control unit 1001 according to an embodiment. So long as a function of the invention is executed, it will be understood that the invention can be applied to any one of a single equipment, a system comprising a plurality of equipment, and a system in which processes are executed through a network such as LAN or the like.

In the diagram, reference numeral 2000 denotes a host computer which is connected to a printer control unit 1001 through the predetermined interface 1-11 (for example, a two-way the interface) and executes a communication control process with a printer 1000.

In the printer control unit 1001, reference numeral 1-1 denotes a printer CPU for systematically controlling access to various kinds of devices which are connected to a system bus 1-4 on the basis of a control program in ROM 1-2 and outputting an image signal as output information to a print unit (printer engine) 1-9 which is connected through an engine interface 1-8. In the control program in the ROM 1-2, a control program of the CPU 1-1, an image generating program for generating a bit map image which is transferred to the printer engine 1-9, and the like shown in FIGS. 3 to 7 have been stored. Font data (outline font data or dot font data) which is used when generating the output image and the like have also been stored in the ROM 1-2.

The CPU 1-1 is constructed so that it can communicate with the host computer through an input unit 1-5. Reference numeral 1-6 denotes RAM which functions as a main memory, a work area, or the like of the CPU 1-1. A memory capacity can be expanded by an optional RAM which is connected to an expansion port (not shown). An input buffer for storing received data, a page buffer memory to store data to be printed as an intermediate code, a band memory to develop a bit map image, and a cache memory to store a form image converted into a bit map are included in the RAM 1-6. A flash memory 1-3 as an external memory is used as a registration memory or the like for storing form data transferred from a form file in the host computer 2000. Reference numeral 1-10 denotes an ASIC comprising a compressor for compressing data and a decompressor for decompressing the compressed data.

An access of the flash memory 1-3 is controlled by a memory controller 1-7. The flash memory 1-3 is connected as an option and stores form data, font data, an emulation program, and the like. Reference numeral 1012 denotes an operation panel mentioned above in which switches for operation, a LCD (liquid crystal display), and the like are arranged.

The foregoing flash memory is not limited to one memory, and it is also possible to be constructed in a manner such that a plurality of flash memories are provided, and a plurality of external memories in which an optional font card and a program to interpret a printer control language of a different language system (PDL) have been stored in addition to a built-in font can be connected. A memory card such as a hard disk or the like other than the flash memory can be also attached. Further, it is also possible to have a NVRAM (not shown) and to store printer mode set information from the operation panel 1012.

On the basis of data which is outputted from an application program 2001 which operates on the host computer 2000, a printer driver program 2002 generates print data of the PDL format and outputs to the printer through the interface 1-11.

A data processing operation of the print control apparatus according to the invention will now be described hereinbelow with reference to flowcharts shown in FIGS. 2 and 3.

Figure 2:
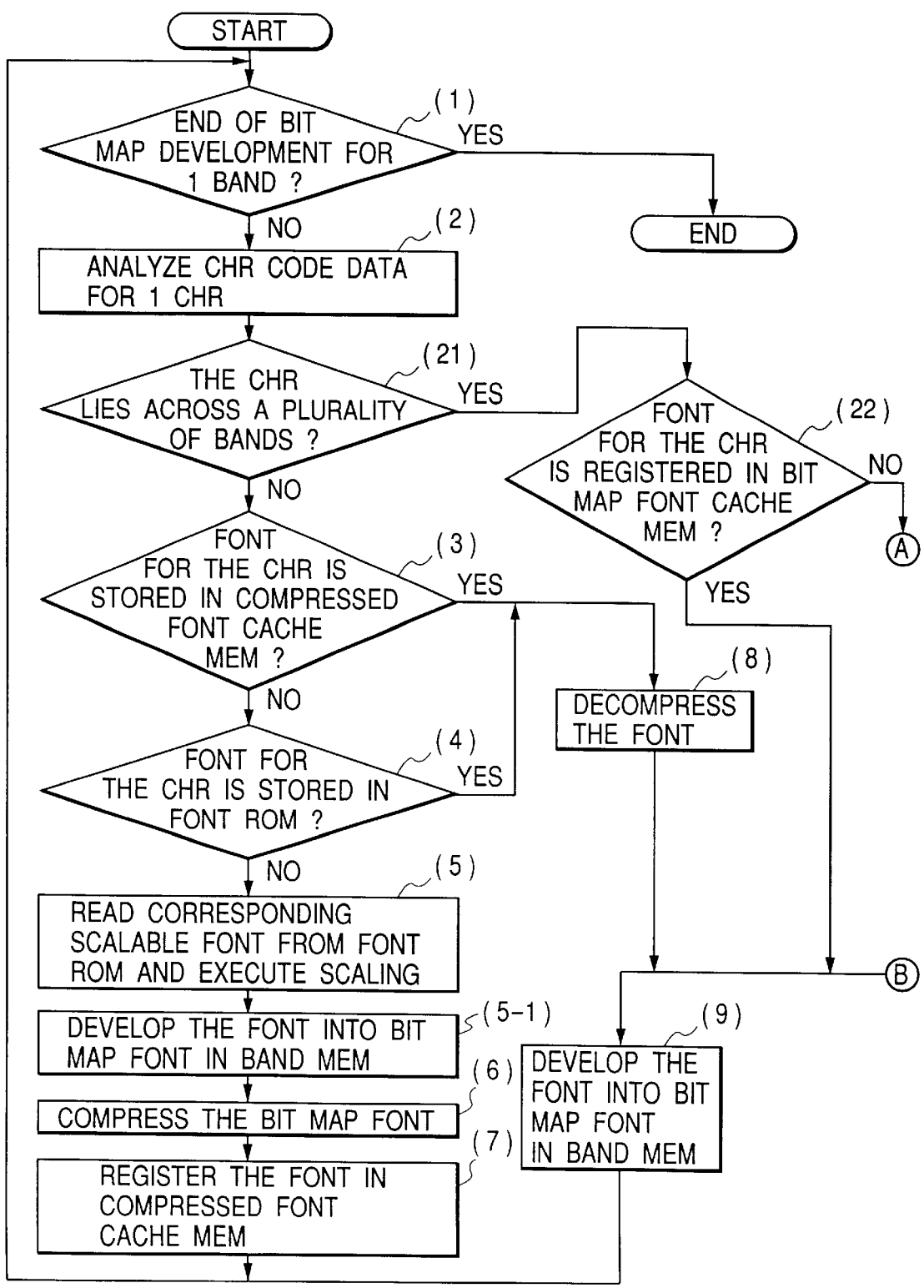
FIG. 2 is a flowchart showing an example of a data processing procedure of the print control apparatus according to the invention.
Figure 3:
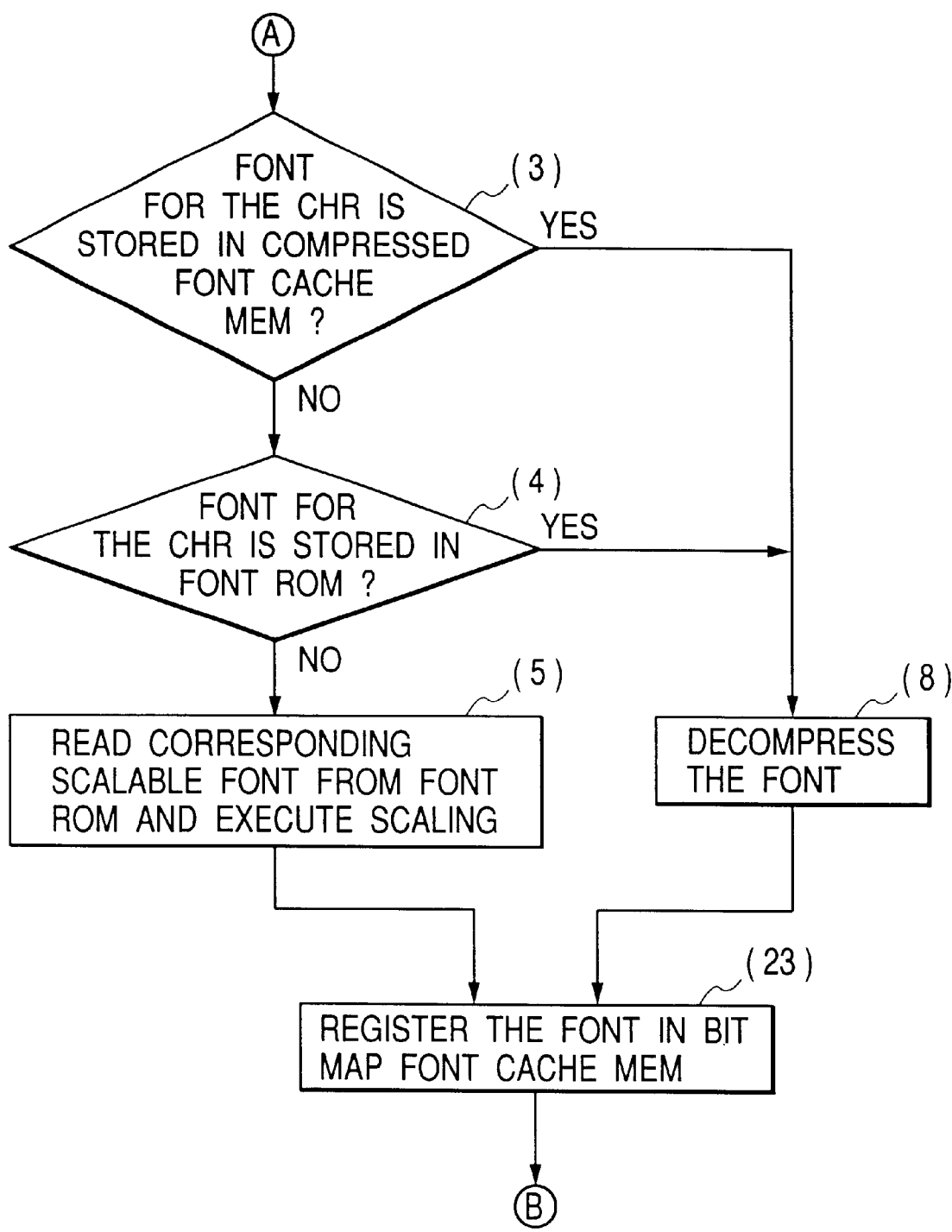
FIG. 3 is a flowchart showing an example of a data processing procedure of the print control apparatus according to the invention.
Figure 8:
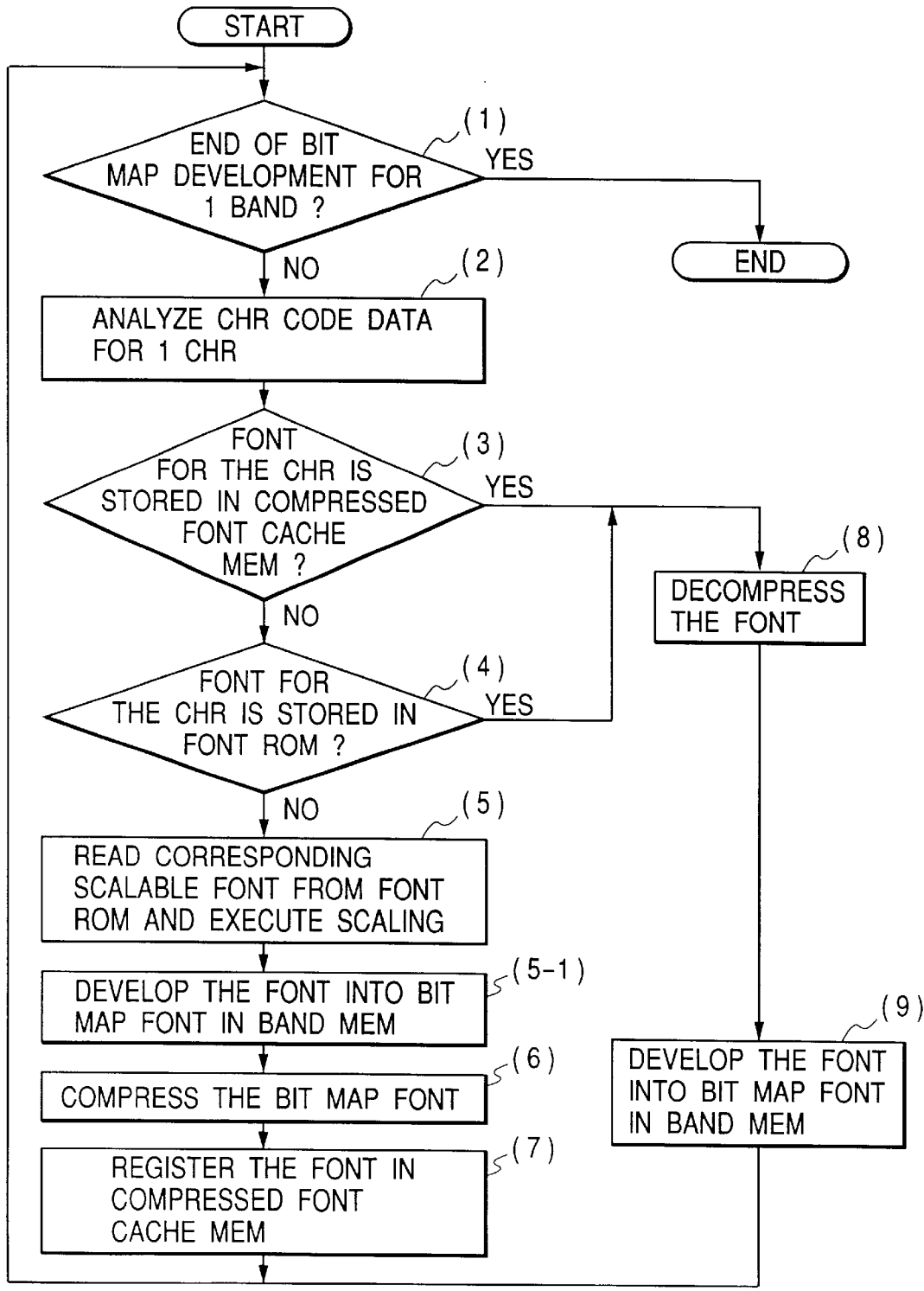
FIG. 8 is a flowchart showing an example of a data processing procedure of a conventional printing apparatus.

FIGS. 2 and 3 are flowcharts showing an example of a data processing procedure of the print control apparatus according to the invention. Reference numerals (21) to (23) denote respective processing steps and the same steps as those in FIG. 8 are designated by the same step numbers. A program regarding the flowchart is stored in the ROM 1-2 and is executed by the CPU 1-1.

The CPU 1-1 stores character code data as much as one band from the host computer 2000 into the input buffer. A check is made to see if a bit map developing process corresponding to one band has been finished (1). If YES, the processing routine is finished. If NO, the CPU 1-1 analyzes the character code data for every character (2) and first discriminates whether or not the character is a character which lies across a plurality of bands (21). When it is determined that the character does not lie across a plurality of bands, an operation similar to that in the conventional printing apparatus is executed. Therefore, its description is omitted.

In step (21), when it is determined that the character lies across a plurality of bands, a check is made to see if the character has been registered in a bit map font cache memory (22). If YES, a bit map font of the character is read out from the bit map font cache memory and is developed into a band memory (9).

When it is determined in step (22) that the character is not registered, an operation similar to that of the conventional printing apparatus is executed and the bit map font of the character is registered into the bit map font cache memory (23). The processing routine is returned to step (9).

Thus, the character which lies across a plurality of bands is cached in a state of the bit map font. At the time of the processing of a next band, the character can be directly developed from the bit map font cache memory into the band memory.

The invention is not limited to the foregoing embodiment but various modifications are possible within the scope of the invention without departing from the essence of the invention. For example, it is also possible to use a construction such that the bit map font cache memory exists in the ASIC.

(Another embodiment of the invention)

Another embodiment of the invention will now be described.

In the foregoing embodiment, the example in which the developing process from the received data to the band memory is directly executed has been described. However, an embodiment in which an intermediate code of each band is generated from the received data of one page bit map data is developed in the band memory on the basis of the generated intermediate code of each band, and the developed bit map data is outputted to the printer engine will now be described with reference to FIGS. 4, 5, and 6.

Figure 4:
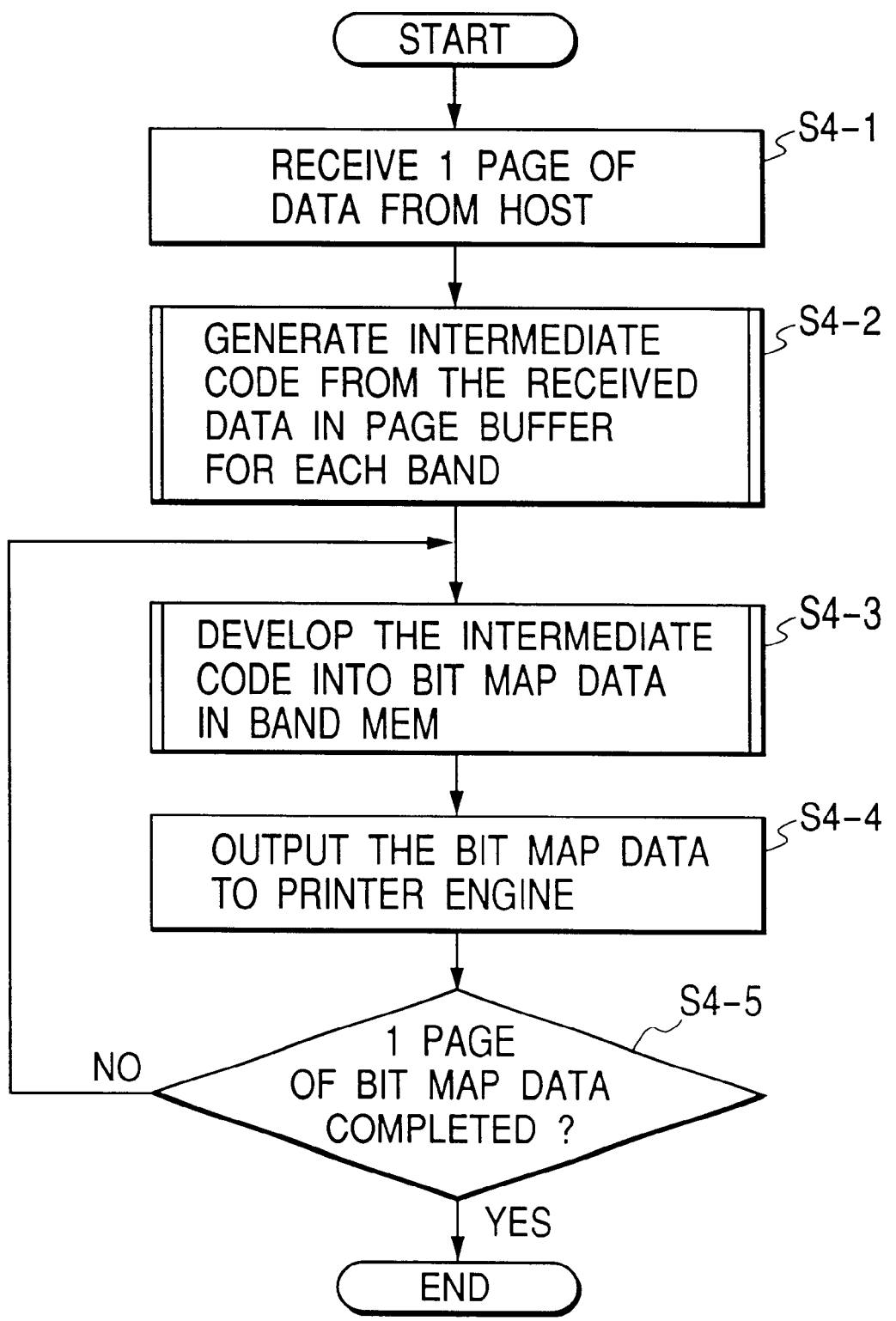
FIG. 4 is a flowchart showing an example of a processing procedure of another embodiment.

In FIG. 4, first in step S4-1, data of one page is received from the host computer. Step S4-2 follows and an intermediate code of each band is generated on the basis of the received data. The details will be explained with reference to FIG. 5. In step S4-3, bit map data is developed in the band memory on the basis of the generated intermediate code of each band. The details will be explained with reference to FIG. 6. In step S4-4, the bit map data developed in the band memory is outputted to the printer engine. In step S4-5, a check is made to see if the output of the bit map data for one page has been finished. If it is determined that the output is not finished yet, the processing routine is returned to step S4-3.

By executing what is called a double buffer system such that an outputting process of the bit map data of a certain band is executed in step S4-4 and, in parallel with it, a developing process of a next band is executed in step S4-3, the printing process can be executed at a high speed.

Figure 5:
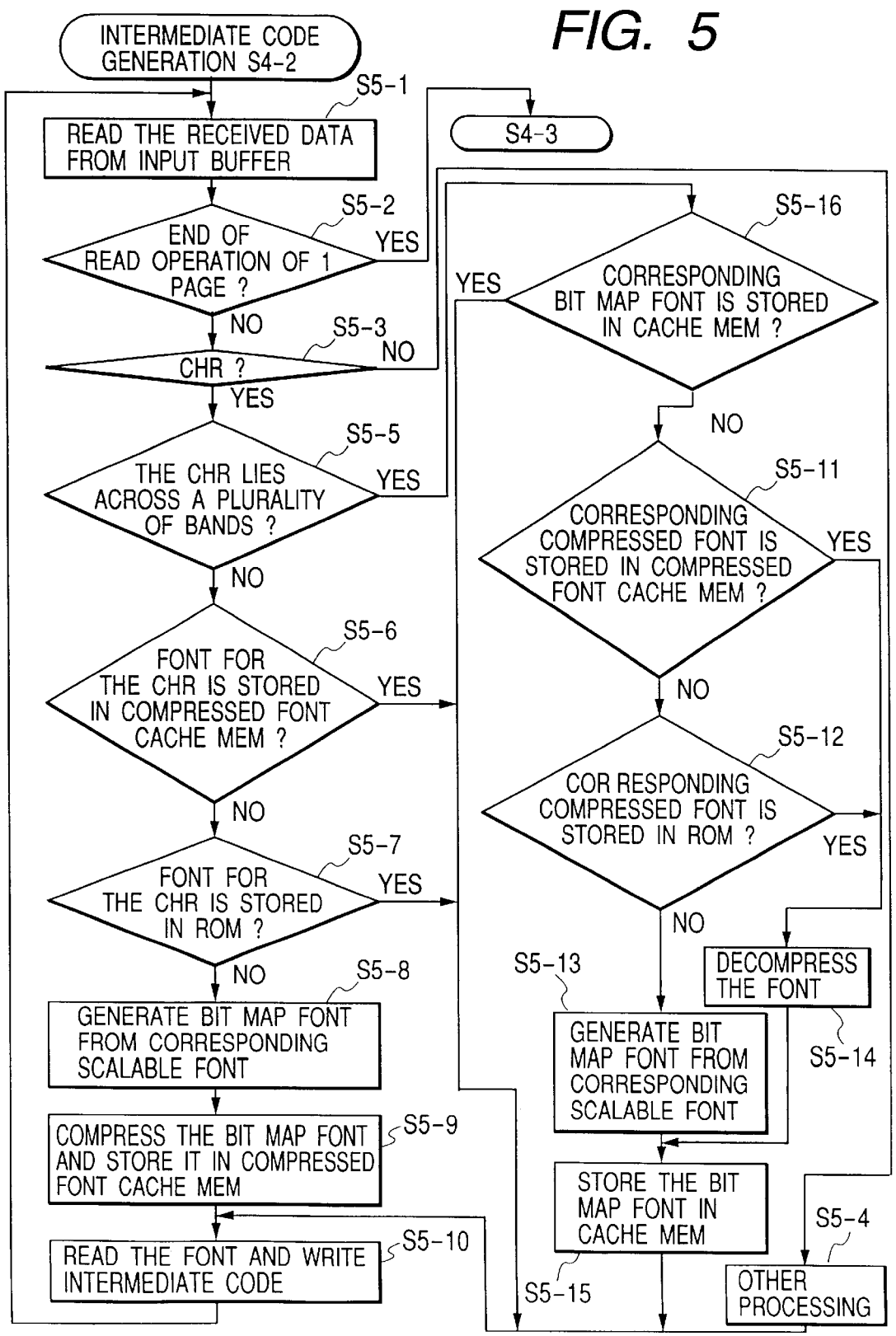
FIG. 5 is a flowchart showing an example of a processing procedure of another embodiment.
Figure 6:
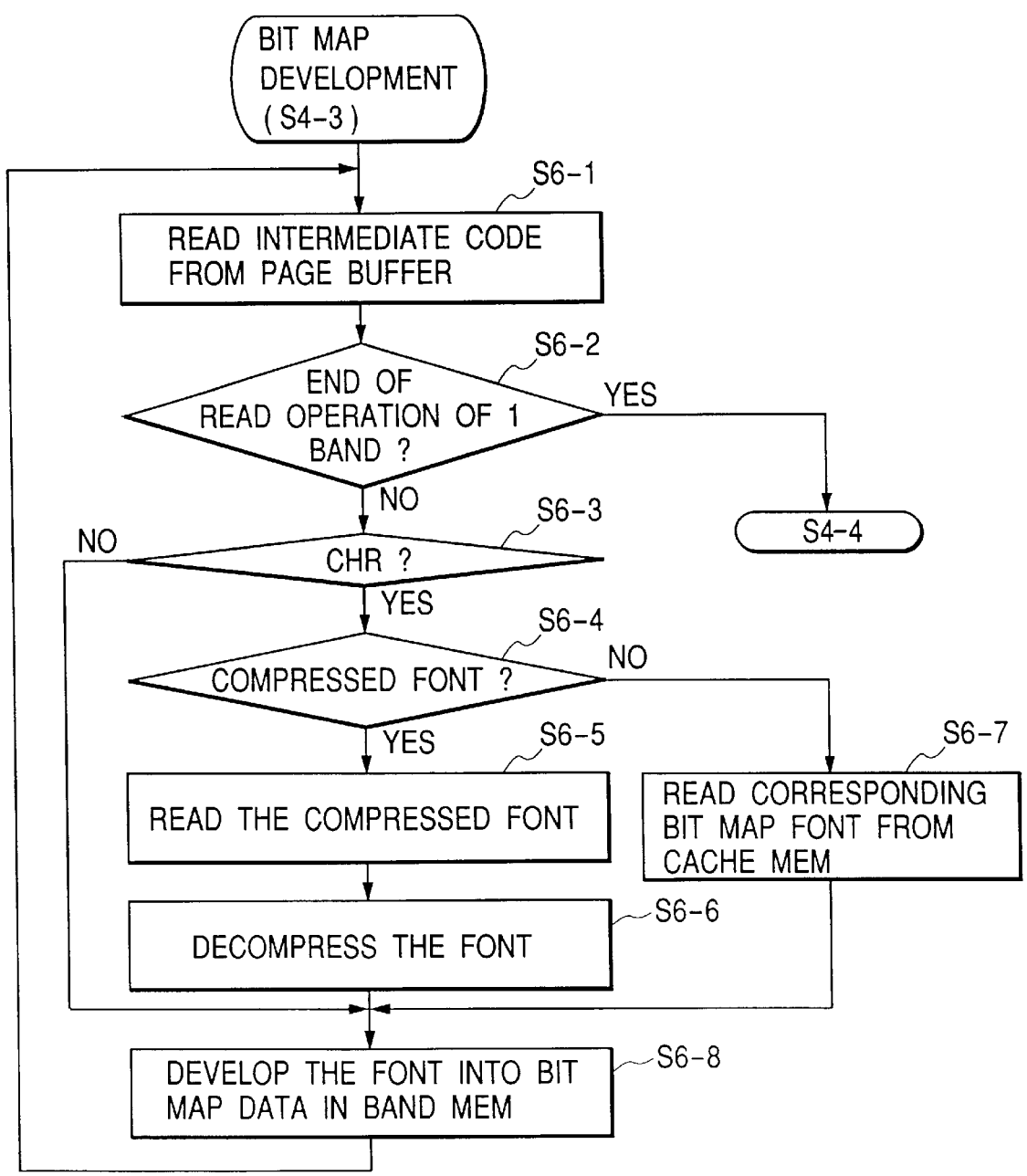
FIG. 6 is a flowchart showing an example of a processing procedure of another embodiment.

The intermediate code generating process in step S4-2 in FIG. 4 will now be described with reference to FIG. 5. In step S5-1, the data stored in the input buffer is read out. In step S5-2, a check is made to see if the reading of the reception data of one page has been finished. If it is decided that the reading has been finished, the processing routine is returned to step S4-3.

When it is determined that the reading is not finished yet in step S5-2, step S5-3 follows. A check is made to see if the read-out data relates to a character. When it is decided that the read-out data is not a character (namely, when it is a figure, an image, or the like), step S5-4 follows and another process is executed. Step S5-10 follows and the corresponding intermediate code is written into the page buffer memory. When it is decided in step S5-3 that the read-out data is the character, step S5-5 follows and whether the character lies across a plurality of bands or not is discriminated on the basis of the position information of the character to be developed and the information of the area of the bit map which is written into the band memory. When it is determined in step S5-5 that the character does not lie across the bands, step S5-6 follows. A check is made to see if the corresponding compressed font has been cached in the compressed font cache memory of the RAM. When it is determined in step S5-6 that it is not cached, whether the corresponding compressed font has been stored in the ROM is discriminated in step S5-7. If it is decided in step S5-7 that it is not stored, a bit map font is generated from the corresponding scalable font in step S5-8. The generated bit map font is compressed by the compressor 1-10 in step S5-9 and is cached into the compressed font cache memory. In step S5-10, the cached compressed font is read out and the intermediate code to be developed is written at the designated position. When it is determined in steps S5-6 and S5-7 that the compressed font exists, the compressed font is read out in step S5-10 and the intermediate code to be developed is written at the designated position.

When it is decided in step S5-5 that the character lies across the bands, step S5-16 follows and a check is made to see if the corresponding bit map font has been cached in the cache memory. If it is determined in step S5-16 that the bit map font has been cached, step S5-10 follows. The cached bit map fonts in a range from the designated position to the designated position are read out and the intermediate code to be developed is written at the designated position.

When it is decided in step S5-16 that the bit map font is not cached, step S5-11 follows. A check is made to see if the corresponding compressed font has been cached in the compressed font cache memory of the RAM. If it is decided in step S5-11 that the compressed font is not cached, a check is made in step S5-12 to see if the corresponding compressed font has been stored in the ROM. When it is decided in step S5-12 that the compressed font is not stored, a bit map font is generated from the corresponding scalable font in step S5-13. The generated bit map font is cached into the cache memory in step S5-15. In step S5-10, the cached bit map fonts in a range from the designated position to the designated position are read out and the intermediate code to be developed is written at the designated position. When it is determined in steps S5-11 and S5-12 that the compressed font exists, the compressed font is read out and decompressed by the decompressor in step S5-14 and the decompressed bit map font is cached into the cache memory. In step S5-10, the cached bit map font is read out and the intermediate code to be developed is written at the designated position. A process for developing the bit map into the band memory in step S4-3 in FIG. 4 will now be described with reference to FIG. 6.

First in step S6-1, the intermediate code is read out from the page buffer memory. In step S6-2, a check is made to see if the reading of the data for one band has been finished. When it is determined that the reading has been finished, the processing routine is returned to step S4-4.

When it is determined in step S6-2 that the reading of one band is not finished, a check is made in step S6-3 to see if the read-out intermediate code corresponds to the character. If it is decided that the intermediate code does not correspond to the character, the bit map data is developed in the band memory on the basis of the read-out intermediate code in step S6-8. When it is determined in step S6-3 that the intermediate code corresponds to the character, in step S6-4, whether or not it is the compressed font is discriminated from the read-out intermediate code. When it is determined that it is the compressed font, the compressed font is read out in step S6-5. The read-out compressed font is decompressed by the decompressor in step S6-6. In step S6-8, the decompressed bit map font is developed at the designated position in the band memory.

When it is discriminated in step S6-4 that it is the bit map font which is not compressed, the bit map font of the corresponding portion is read out in step S6-7. The read-out bit map font is developed at the designated position in the band memory in step S6-8.

A construction of a data processing program which can be read out by the print control apparatus according to the invention will now be described hereinbelow with reference to a memory map shown in FIG. 7.

FIG. 7 is a diagram for explaining a memory map of the memory medium (ROM 1-2) to store various data processing programs which can be read out by the print control apparatus according to the invention.

Although not particularly shown, information to manage a group of programs which are stored into the memory medium, for example, version information, the person who made, the program and the like are also stored. There is also a case where information depending on the OS or the like on the program reading side, for example, an icon and the like to discriminate and display the program are also stored.

Further, the data belonging to various programs is also managed in the directory. When a program to install various programs into a computer or a program to be installed has been compressed, there is also a case where a program for decoding or the like is also stored.

The functions shown in FIGS. 2 to 6 in the embodiment can be also executed by a host computer on the basis of a program which is installed from the outside. In such a case, the invention is applied even in the case where the information group including the program is supplied to an output apparatus from a memory medium such as CD-ROM, flash memory, FD, or the like or from an external memory medium through a network.

As mentioned above, it will be obviously understood that the object of the invention is also accomplished by a method whereby a memory medium in which program codes of software to realize the function of the foregoing embodiment have been recorded is supplied to a system or an apparatus and a computer (or CPU or MPU) of the system or apparatus reads out and executes the program codes stored in the memory medium.

In this case, the program codes themselves read out from the memory medium realize the novel function of the invention. The memory medium in which the program codes have been stored constructs the invention.

As a memory medium to supply the program codes, for example, it is possible to use any one of a floppy disk, a hard disk, an optical disk, a magnetooptic disk, a CD-ROM, a CD-R, a magnetic tape, a non-volatile memory card, a ROM, an EEPROM, or the like.

It will be obviously understood that the invention also incorporates not only a case where the functions of the foregoing embodiment are realized by executing the program codes read out by the computer but also a case where on the basis of instructions of the program codes, the OS (Operating System) or the like which operates on the computer executes a part or all of the actual processes, and the functions of the embodiment are realized by those processes.

Further, it will be obviously understood that the invention also incorporates a case where after the program codes read out from the memory medium were written into a memory provided for a function extended board inserted in the computer or a function extended unit connected to the computer, a CPU or the like provided for the function extended board or function extended unit executes a part or all of the actual processes on the basis of instructions of the program codes and the functions of the foregoing embodiment are realized by the processes.

According to the embodiment of the invention as described above, the print control apparatus comprises: the band memory to store data to be outputted from the printer engine on a predetermined band unit basis; decompressing means for decompressing the compressed font data to the bit map font data; discriminating means for discriminating whether the bit map font data decompressed by the decompressing means is developed so as to lie across a plurality of bands which are set in the band memory; and a cache memory for caching the bit map font data decompressed by the decompressing means in the case where the discriminating means determines that the decompressed bit map font data is developed across a plurality of bands. Therefore, the bit map font data for the font data which lies across a plurality of bands is cached and a processing burden at the time of the development of a next band is reduced.

The above apparatus further has the developing means for developing the bit map font data decompressed by the decompressing means into the band memory and the developing means reads out the bit map font data stored in the cache memory and develops the bit map font data across a plurality of bands. Therefore, when the bit map font data to be printed is developed across a plurality of bands, the decompressing process from the same font data to the bit map font data is unnecessary. The bit map font development processing time is reduced.

There is provided the print control method of developing the data to be outputted from the printer engine into the band memory on a predetermined band unit or the computer-readable memory medium encoded with the program for controlling the development of the data to be outputted from the printer engine into the band memory on a predetermined band unit basis, wherein the print control method or the program in the memory medium comprises: the decompressing step of decompressing the compressed font data to the bit map font data; discriminating step of discriminating whether or not the decompressed bit map font data is developed across a plurality of bands which are set in the band memory; and caching step of caching the decompressed bit map font data into the cache memory when it is determined by the discriminating step that the decompressed bit map font data is developed across a plurality of bands. Therefore, the bit map font data for the font data across a plurality of bands is cached and a processing burden at the time of the development of a next band is reduced.

Since the program for the print control method has the developing step of reading out the bit map font data cached in the cache memory and developing the bit map font data across a plurality of bands, when the bit map font data to be printed is developed across a plurality of bands, the decompressing process from the same font data to the bit map font data is unnecessary and the bit map font development processing time is reduced.

According to the invention as described above, the processing speed can be raised when the next band is developed.

The band processing speed can be raised while increasing a using efficiency of the memory.

What is claimed is:

1. A print control apparatus comprising:
   an intermediate data generator adapted to read print data and generate intermediate data from the print data; and
   a bit map developer adapted to develop the intermediate data generated by said intermediate data generator into bit map data in a band memory,
   wherein said intermediate data generator discriminates whether a character to be printed lies within one band or across a plurality of bands and compresses a bit map font of the character to be printed and stores the compressed bit map font in a cache memory if it is discriminated that the character lies within one band, and stores in the cache memory a bit map font of the character to be printed without compressing the bit map font if it is discriminated that the character lies across a plurality of bands, so as to generate the intermediate data,
   wherein if a bit map font stored in the cache memory is a compressed font, said bit map developer decompresses the compressed font and develops the decompressed font into the bit map data in bit map memory, and if a bit map font stored in the cache memory is a non-compressed font, said bit map developer develops a necessary portion of the non-compressed font into the bit map data in the bit map memory.

2. An apparatus according to claim 1, wherein said generation means determines whether compressed image data of a character to be printed has been stored in the cache memory, and if the compressed image data has been stored, said generation means reads the compressed image data from the cache memory, decompresses the read image data and stores the decompressed image data in the cache memory.

3. An apparatus according to claim 1, wherein if said discrimination means discriminates that a character to be printed lies within one band, said generation means generates the intermediate data used to (a) read the compressed image data of the character to be printed from the cache memory, (b) decompress the read image data and (c) write the decompressed image data at a designated position of the bit map memory, and wherein if said discrimination means discriminates that a character to b printed lies across a plurality of bands, said generation means generates the intermediate data used to (d) read the image data from the cache memory from one designated position to another designated position and (e) write the read image data at a designated position of the bit map memory.

4. An apparatus according to claim 1, further comprising print means for printing an image based on the image data written into the bit map memory.

5. A print control method comprising the steps of:
reading print data and generating intermediate data from the print data using an intermediate data generator; and
developing the intermediate data generated by said intermediate data generator into bit map data in a band memory using a bit map developer, with said intermediate data generator discriminating whether a character to be printed lies within one band or across a plurality of bands and compressing a bit map font of the character to be printed and storing the compressed bit map font in a cache memory if it is discriminated that the character lies within one band, and storing in the cache memory a bit map font of the character to be printed without compressing the bit map font if it is discriminated that the character lies across a plurality of bands, so as to generate the intermediate data,
wherein if a bit map font stored in the cache memory is a compressed font, said bit map developer decompressing the compressed font and developing the decompressed font into the bit map data in bit map memory, and if a bit map font stored in the cache memory is a non-compressed font, said bit map developer developing a necessary portion of the non-compressed font into the bit map data in the bit map memory.

6. A method according to claim 5, wherein said generating step comprises determining whether compressed image data of a character to be printed has been stored in the cache memory, and if the compressed image data has been stored, said generating step reads the compressed image data from the cache memory, decompresses the read image data and stores the decompressed image data in the cache memory.

7. A method according to claim 5, wherein if said discriminating step discriminates that a character to be printed lies within one band, said generating step generates the intermediate data used to (a) read the compressed image data of the character to be printed from the cache memory, (b) decompress the read image data and (c) write the decompressed image data at a designated position of the bit map memory, and wherein if said discriminating step discriminates that a character to be printed lies across a plurality of bands, said generating step generates the intermediate data used to (d) read the image data from the cache memory from one designated position to another designated position and (e) write the read image data at a designated position of the bit map memory.

8. A method according to claim 5, further comprising a step of outputting the image data written into the bit map memory to a printer engine.

9. A computer readable medium having recorded thereon codes for implementing a computer implementable print control method comprising the step of:
reading print data and generating intermediate data from the print data using an intermediate data generator; and
developing the intermediate data generated by said intermediate data generator into bit map data in a band memory using a bit map developer, with said intermediate data generator discriminating whether a character to be printed lies within one band or across a plurality of bands and compressing a bit map font of the character to be printed and storing the compressed bit map font in a cache memory if it is discriminated that the character lies within one band, and storing in the cache memory a bit map font of the character to be printed without compressing the bit map font if it is discriminated that the character lies across a plurality of bands, so as to generate the intermediate data,
wherein if a bit map font stored in the cache memory is a compressed font, said bit map developer decompressing the compressed font and developing the decompressed font into the bit map data in bit map memory, and if a bit map font stored in the cache memory is a non-compressed font, said bit map developer developing a necessary portion of the non-compressed font into the bit map data in the bit map memory.

10. A medium according to claim 9, wherein said generating step comprises determining whether compressed image data of a character to be printed has been stored in the cache memory, and if the compressed image data has been stored, said generating step reads the compressed image data from the cache memory, decompresses the read image data and stores the decompressed image data in the cache memory.

11. A medium according to claim 9, wherein if said discriminating step discriminates that a character to be printed lies within one band, said generating step generates the intermediate data used to (a) read the compressed image data of the character to be printed from the cache memory, (b) decompress the read image data and (c) write the decompressed image data at a designated position of the bit map memory, and wherein if said discriminating step discriminates that a character to be printed lies across a plurality of bands, said generating step generates the intermediate data used to (d) read the image data from the cache memory from one designated position to another designated position and (e) write the read image data at a designated position of the bit map memory.

12. A medium according to claim 9, further comprising a step of outputting the image data written into the bit map memory to a printer engine.

13. A program product including codes for implementing a computer implementable print control method comprising the steps of:
reading print data and generating intermediate data from the print data using an intermediate data generator; and
developing the intermediate data generated by said intermediate data generator into bit map data in a band memory using a bit map developer, with said intermediate data generator discriminating whether a character to be printed lies within one band or across a plurality of bands and compressing a bit map font of the character to be printed and storing the compressed bit map font in a cache memory if it is discriminated that the character lies within one band, and storing in the cache memory a bit map font of the character to be printed without compressing the bit map font if it is discriminated that the character lies across a plurality of bands, so as to generate the intermediate data,
wherein if a bit map font stored in the cache memory is a compressed font, said bit map developer decompressing the compressed font and developing the decompressed font into the bit map data in bit map memory, and if a bit map font stored in the cache memory is a non-compressed font, said bit map developer developing a necessary portion of the non-compressed font into the bit map data in the bit map memory.

14. A program product according to claim 13, wherein said generating step comprises determining whether compressed image data of a character to be printed has been stored in the cache memory, and if the compressed image data has been stored, said generating step reads the compressed image data from the cache memory, decompresses the read image data and stores the decompressed image data in the cache memory.

15. A program product according to claim 13, wherein if said discriminating step discriminates that a character to be printed lies within one band, said generating step generates the intermediate data used to (a) read the compressed image data of the character to be printed from the cache memory, (b) decompress the read image data and (c) write the decompressed image data at a designated position of the bit map memory, and wherein if said discriminating step discriminates that a character to be printed lies across a plurality of bands, said generating step generates the intermediate data used to (d) read the image data from the cache memory from one designated position to another designated position and (e) write the read image data at a designated position of the bit map memory.

16. A program product according to claim 13, further comprising a step of outputting the image data written into the bit map memory to a printer engine.

* * * * *

UNITED STATES PATENT AND TRADEMARK OFFICE
CERTIFICATE OF CORRECTION

PATENT NO. : 6,281,985 B1
DATED : August 28, 2001
INVENTOR(S) : Yasuaki Sawano

It is certified that error appears in the above-identified patent and that said Letters Patent is hereby corrected as shown below:

Column 2,
Line 52, "bands" should read -- bands; --.

Column 3,
Line 25, "the" should be deleted;
Line 30, "in" should read -- in a --.

Column 4,
Line 65, "page" should read -- page, --.

Column 8,
Line 49, "data," should read -- data, and --.

Column 9,
Line 6, "b" should read -- be --.

Signed and Sealed this

Second Day of April, 2002

Attest:

*Attesting Officer*

JAMES E. ROGAN
*Director of the United States Patent and Trademark Office*